(12) United States Patent
Mack

(10) Patent No.: US 10,516,286 B2
(45) Date of Patent: Dec. 24, 2019

(54) INDUCTIVE CHARGING DEVICE FOR CHARGING BATTERIES

(71) Applicant: Robert Bosch GmbH, Stuttgart (DE)

(72) Inventor: Juergen Mack, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 14/952,753

(22) Filed: Nov. 25, 2015

(65) Prior Publication Data

US 2017/0149266 A1 May 25, 2017

(51) Int. Cl.
*H02J 7/02* (2016.01)

(52) U.S. Cl.
CPC .............. *H02J 7/025* (2013.01); *H02J 7/027* (2013.01)

(58) Field of Classification Search
CPC ....................................................... H02J 7/025
USPC ....................................................... 320/108
See application file for complete search history.

(56) References Cited

U.S. PATENT DOCUMENTS

| 9,780,600 | B2 * | 10/2017 | Sentosa | H02J 7/042 |
| 2013/0134931 | A1 * | 5/2013 | Tomiki | H04B 5/0037 |
| | | | | 320/108 |
| 2015/0380978 | A1 * | 12/2015 | Toivola | H02J 7/04 |
| | | | | 320/108 |
| 2016/0254659 | A1 * | 9/2016 | Chambon | B60L 11/182 |
| | | | | 320/108 |

* cited by examiner

*Primary Examiner* — Eric D Lee
(74) *Attorney, Agent, or Firm* — Maginot, Moore & Beck LLP

(57) ABSTRACT

The invention relates to an inductive charging device for charging at least one battery, in particular at least one portable power tool battery, with a charging unit provided for transferring electrical energy to the at least one battery, and with a detector unit provided for detecting a removal of the at least one battery during a charging process. It is proposed that the detector unit includes at least one sensor provided for monitoring at least a resonance voltage and/or at least a resonance current of the charging unit.

8 Claims, 4 Drawing Sheets

INDUCTIVE CHARGING DEVICE FOR CHARGING BATTERIES

STATE OF THE ART

Figure 1:
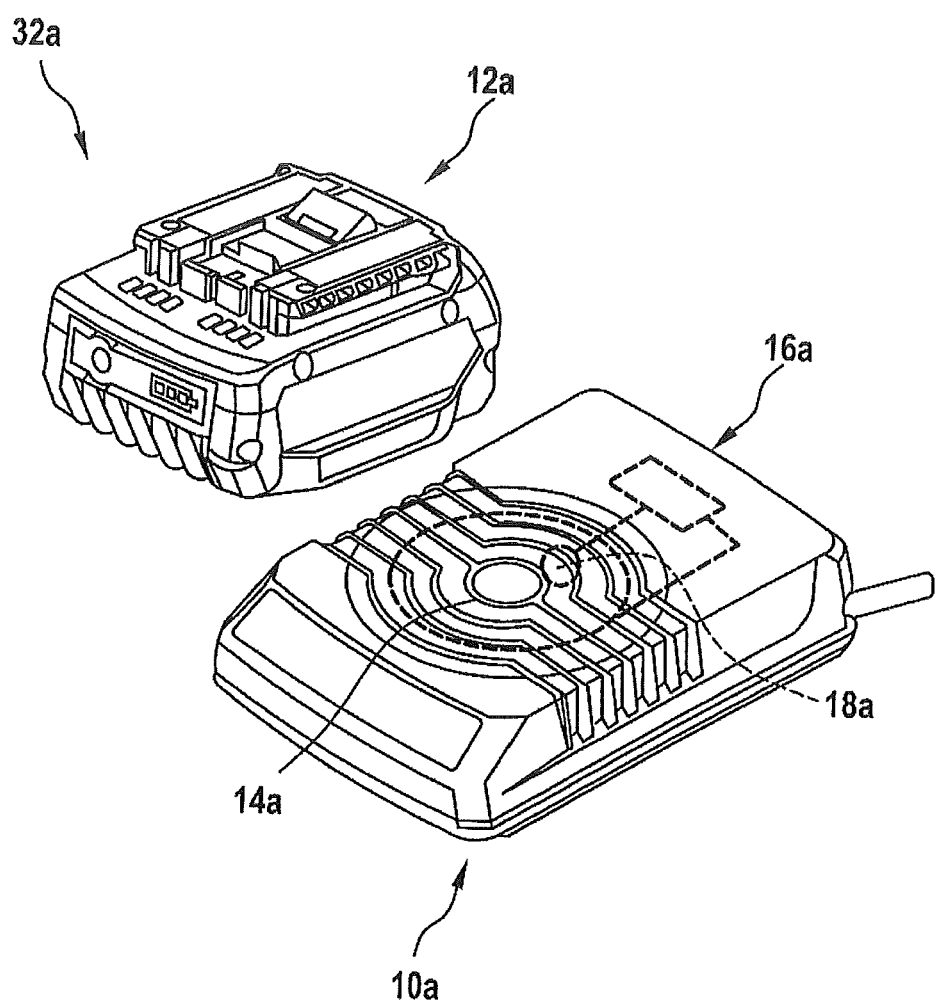

Inductive charging devices for charging batteries, particularly hand power tools batteries, are known, which are comprising charging units provided for transferring electrical energy to the at least one battery, and detector units provided for detecting a removal of the at least one battery during a charging process.

DISCLOSURE OF THE INVENTION

The invention relates to a inductive charging device for charging at least one battery in particular at least one portable power tool battery, with a charging unit provided for transferring electrical energy to the at least one battery, and with a detector unit provided for detecting a removal of the at least one battery during a charging process.

It is proposed, that the detector unit comprises at least one sensor provided for monitoring at least a resonance voltage and/or at least a resonance current of the charging unit. By "provided" should particularly be understood specially programmed, designed and/or equipped. It should be in particular understood that an object provided for a specific function, fulfills and/or executes this particular function in at least one application and/or operating state. A "charging unit" in particular should be understood as an electronic unit provided for transforming an electrical energy provided by a power source, in particular by an energy supply network, and transferring the electrical energy wirelessly, preferably inductive, to at least one receiver, which is particularly provided for receiving the electrical energy and/or for storing the electrical energy at least temporarily. In particular, the charging unit comprises at least one resonance circuit, which comprises at least one coil, which is in particular provided for generating an alternating magnetic field, and at least one resonance capacitor.

A "detector unit" should in particular be understood as a electronic and/or electromechanical and/or mechanical unit, which is particularly provided for detecting at least a change of an electronic and/or mechanical parameter and/or at least an occurrence of an electronic and/or mechanical parameter caused by a removal of a battery from the charging unit during a charging process. A "sensor" should be understood in this context in particular as a current and/or voltage sensor provided for detecting an electrical current and/or an electrical voltage directly or indirectly. By "the sensor is provided for monitoring at least a resonance voltage and/or at least a resonance current of the charging unit" should particularly be understood, that the sensor detects the resonance voltage and/or the resonance current of the charging unit, in particular of a charging unit's resonance circuit, continuously and/or at discrete, in particular equidistant, points in time during a charging process and examines the resonance voltage and/or the resonance current regarding characteristics typical for a removal of a battery during a charging process. In particular, the sensor is provided for detecting a deviation of the resonance voltage and/or of the resonance current from at least one limit value, in particular an overshoot, during a charging process and/or an, in particular steady, increase of the resonance voltage and/or of the resonance current during a charging process characteristic for a removal of a battery.

By such a configuration a generic charging device with advantageous properties regarding a detection of a removal of a battery during a charging process can be provided. In particular by monitoring a resonance voltage and/or a resonance current of the charging unit a removal of a battery during a charging process can be detected advantageously simple and/or reliability and/or fast.

It is also proposed, that the detector unit is provided for interrupting the transmission of electrical energy in case of a deviation of the resonance voltage and/or of the resonance current from a limit value. In particular the detector unit is provided for at least substantially de-energizing the charging unit, in particular a resonance circuit of the charging unit, in case of a deviation of the resonance voltage and/or the resonance current from a limit value, in particular when the resonance voltage and/or the resonance current exceeds the limit value, during a charging process. In particular, an interruption of an transmission of electrical energy is carried out immediately, particularly not more than 200 ms, advantageous not more than 100 ms and preferred not more than 50 ms, after detecting a deviation of the resonance voltage and/or the resonance current from the limit value during a charging process. Hereby an increased stress on the charging unit caused by removal of a battery during a charging process can advantageously avoided to the greatest extent unit, whereby an advantageously long life span of the charging unit can be achieved.

In a preferred embodiment of the invention it is proposed, that the detector unit is provided for interrupting the transmission of electrical energy in case of a steady increase of the resonance voltage and/or of the resonance current. In particular the detector unit is provided for at least substantially de-energizing the charging unit, in particular a resonance circuit of the charging unit, in case of a steady increase of the resonance voltage and/or of the resonance current during a charging process, in particular, an interruption of a transmission of electrical energy is carried out immediately, particularly nor more than 200 ms, advantageous not more than 100 ms and preferred not more than 50 ms, after detecting a steady increase of the resonance voltage and/or of the resonance current. Hereby an increased stress on the charging unit caused by removal of a battery during a charging process can advantageously avoided to the greatest extent unit, whereby an advantageously long life span of the charging unit can be achieved.

Further an inductive charging system with at least one inductive charging device according to the present invention and with at least one battery, in particular at least one portable power tool battery, is proposed, in particular, the at least one battery may be formed as a separate unit and may be particularly connectable with a handheld power tool or the at least one battery may be partially and preferably fully integrated into a portable power tool. As "handheld power tool" should be understood in particular as a power tool, which can be transported by an operator without using a transport machine. The handheld power tool has in particular a mass which is less than 40 kg, preferably loss than 10 kg, and more preferably less than 5 kg. Preferably, the handheld power tool has a mass which corresponds to a value from a value range from 2 kg to 13 kg.

Preferably, the portable power tool is designed as a drilling- and/or chisel hammer. It is also conceivable that the handheld power tool has a different configuration such as a configuration, as a hammer drill a screwdriver, a drill, a garden machine, a planer, a circular saw or the like. This allows an advantageous simple and/or safe charging of a battery. In particular, a charging of the battery may be advantageous interrupted at any time by removing the battery from the charging unit.

In addition a method for detecting a removal of at least one battery during an inductive charging process with means of a charging device according to the present invention, wherein at least a resonance voltage and/or at least a resonance current of the charging device's charging unit is monitored. Particularly the resonance voltage and/or the resonance current of the charging unit, in particular of a charging unit's resonance circuit, is detected continuously and/or at discrete, in particular equidistant, points in time during a charging process and examined regarding characteristics typical for a removal of a battery during a charging process. By monitoring a resonance voltage and/or a resonance current of the charging unit a removal of a battery during a charging process can be detected advantageously simple and/or reliability and/or fast It is also proposed, that the resonance voltage and/or the resonance current is/are continuously monitored during a charging process. By "the resonance voltage and/or the resonance current is/are continuously monitored during a charging process" should be particularly understood, that the resonance voltage and/or the resonance current is/are examined regarding characteristics typical for a removal of a battery over an entire period of a charging process without time interruption or at discrete, in particular equidistant, points in time. This allows an advantageously reliable detection of a removal of the battery during charging process.

It is further proposed, that the resonance voltage and/or the resonance current is/are detected several times within a specified time period. By "the resonance voltage and/or the resonance current is/are detected several times within a specified period of time" should be understood in particular, that that the resonance voltage and/or the resonance current is/are measured at a plurality or successive points in time within each time interval during a charging process. In particular the resonance voltage and/or the resonance currant is/are measured during a charging operation at several successive points in time within consecutive identical time intervals, in particular, the values of the resonance, voltage and/or the resonance current detected within a time interval are compared to each other. Hereby a steady increase of the resonance voltage and/or of the resonance current can be detected advantageous simple and/or reliable.

It is also proposed, that a transmission of electrical energy to the battery is interrupted in case of a deviation of the resonance voltage and/or of the resonance current from a limit value, in particular, the charging unit, in particular a resonance circuit of the load unit, is at least substantially de-energized in case a deviation of the resonance voltage and/or the resonance current from a limit value, in particular an overshoot, is detected during a charging process in particular, an interruption of an transmission of electrical energy is carried out immediately, particularly not more than 200 ms, advantageous not more than 100 ms and preferred not more than 50 ms, after detecting a deviation of the resonance voltage and/or the resonance current from the limit value during a charging process. Hereby an increased stress on the charging unit caused by removal of a battery during a charging process can advantageously avoided to the greatest extent units whereby an advantageously long life span of the charging unit can be achieved.

If is further proposed, that a transmission of electrical energy to the battery is interrupted in case of a steady increase of the resonance voltage and/or of the resonance current, in particular, the charging unit, in particular a resonance circuit of the load unit, is at least substantially de-energized in case a steady increase of the resonance voltage and/or the resonance current is detected during a charging process, in particular, an interruption of an transmission of electrical energy is carried out immediately, particularly not more than 200 ms, advantageous not more than 100 ms and preferred not more than 50 ms, after detecting a steady increase of the resonance voltage and/or the resonance current during a charging process. Hereby an increased stress on the charging unit caused by removal of a battery during a charging process can advantageously avoided to the greatest extent unit, whereby an advantageously long life span of the charging unit can be achieved.

The charging device according to the invention, the charging system according to the invention and/or the method according to the invention shall not be limited to the application and embodiment described above. In particular, the charging device according to the inventions the charging system according to the invention and/or the method according to the invention may provide a different number of elements herein, components and units as described to fulfill a function described herein.

DRAWING

Figure 2:
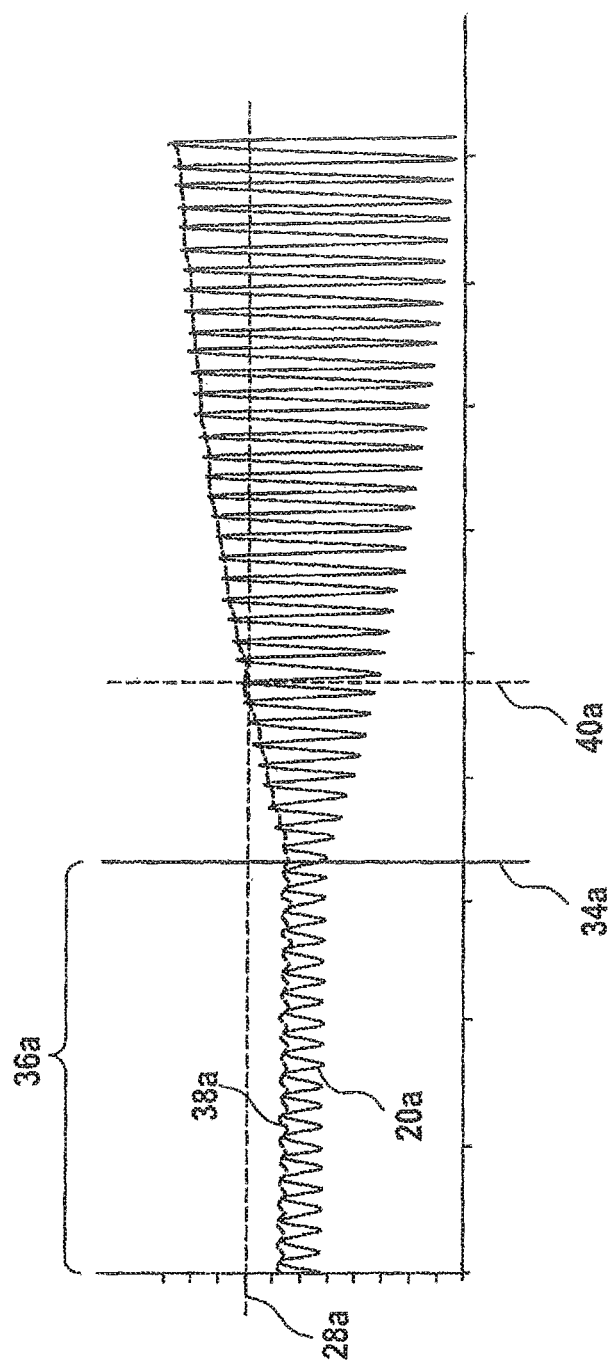
Figure 3:
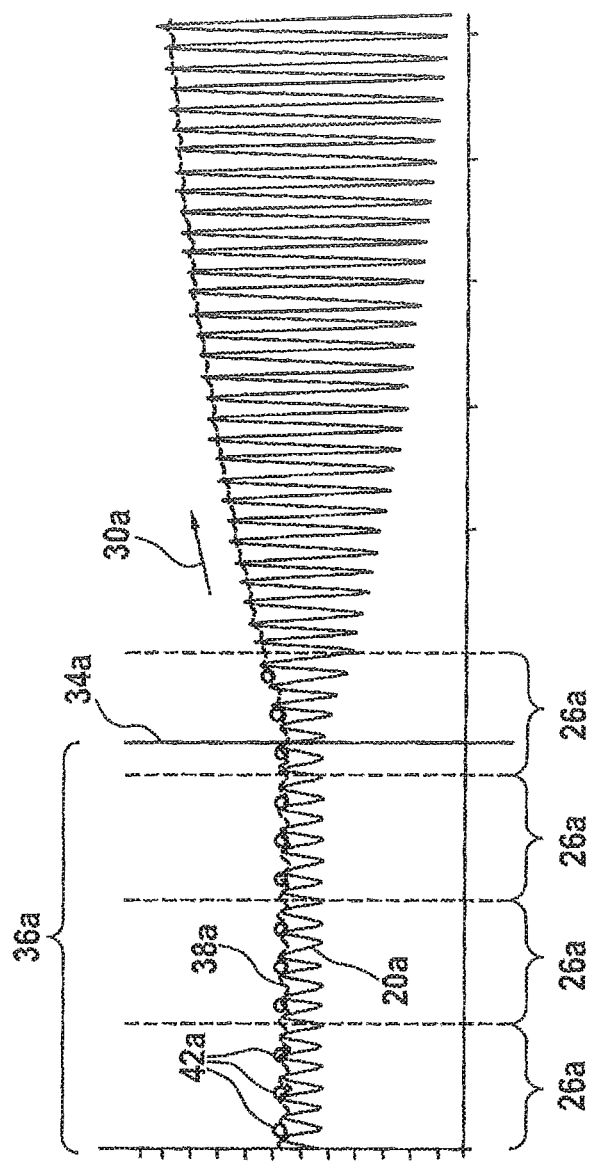
Figure 4:
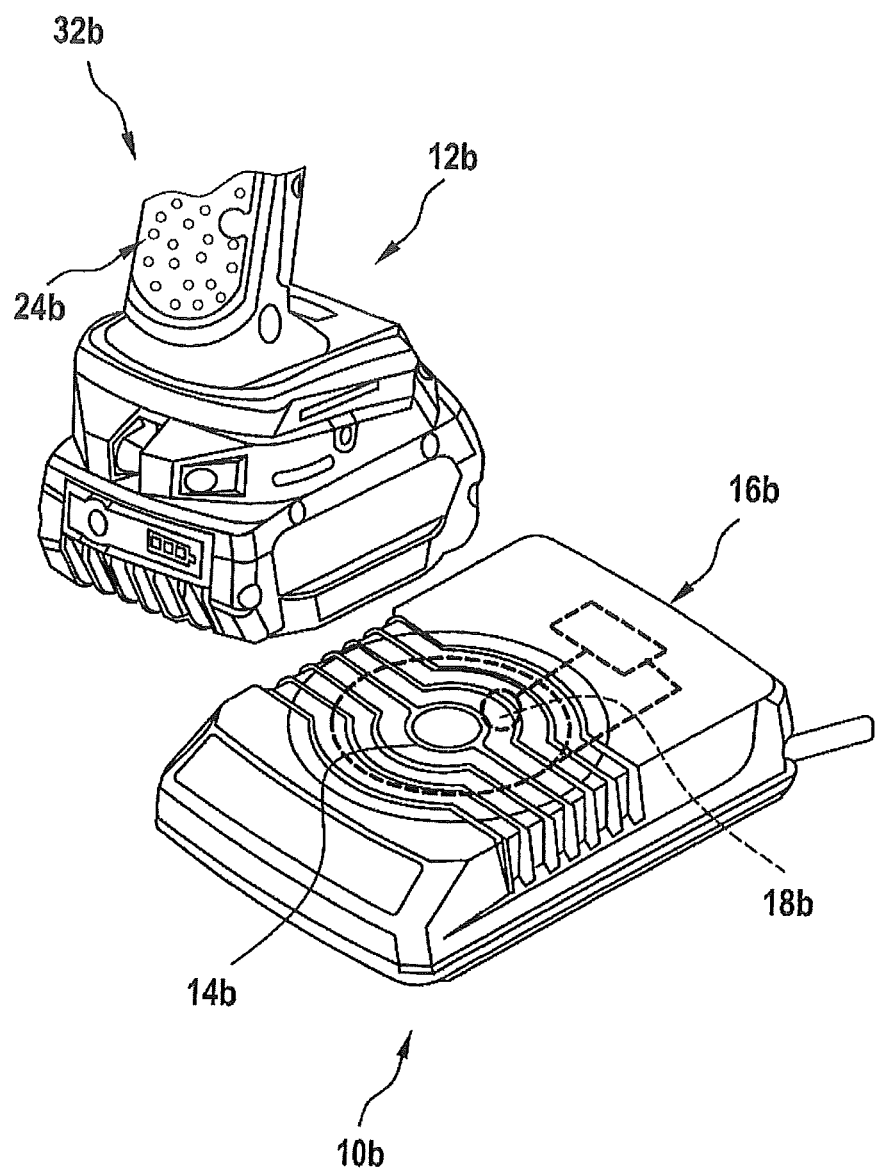

Further advantages arise from the following drawing and its description. The drawing shows two embodiments of the invention. The drawing, the description and the claims contain numerous features in combination. The person skilled in the art will consider the features expediently individually and combine them into additional, meaningful combinations Showing:

FIG. 1 a charging system with a battery and a charging device with a detector unit for inductive charging the battery, FIG. 2 a curve diagram of a resonance voltage and/or a resonance current when detection the resonance voltage and/or a resonance current exceeding a limit, FIG. 3 a curve diagram of a resonance voltage and/or a resonance current when detecting a steady increase and FIG. 4 an alternative charging system with a handheld power tool comprising an integrated battery and a charging device with detector unit for inductive charging the battery.

DESCRIPTION OF THE EMBODIMENTS

FIG. 1 shows a charging system 32a with an inductive charging device 10a and a battery 12a. The inductive charging device 10a is provided for inductive charging the battery 12a. The battery 12a is formed as a portable power tool battery. The inductive charging device 10a includes a charging unit 14a. The charging unit 14a is provided for transferring electrical energy to the battery 12a during a charging process. For this purpose the battery 12a is put on the charging unit 14a of the charging device 10a. Further, the inductive charging device 10a includes a detector unit 16a. The detector unit 16a is provided for detecting a removal of the battery 12a from the charging unit 14a during a charging process. The detector unit 16a comprises a sensor 18a, in particular a current and/or voltage sensor. The sensor 18a is provided for monitoring, a resonance voltage and/or a resonance current 20a of the charging unit 14a during a charging process.

The detector unit 16a is provided for interrupting the transfer of electrical energy from the charging unit 14a to the battery 12a in case of a deviation of the resonance voltage and/or the resonance current 20a from a limit value 28a during a charging process, in particular the detector unit 16a is provided to interrupt the transmission of electrical energy from the charging unit 14a to the battery 12a in case the resonance voltage and/or the resonance current 20a exceed the limit value 28a during a charging operation. Alternatively or additionally the detector unit 16a is provided for interrupting the transmission of electrical energy from the charging unit 14a to the battery 12a in case of a steady increase 30a of the resonance voltage and/or the resonance current 20a during a charging operation.

FIGS. 2 and 3 are showing each a curve diagram of the resonance voltage and/or the resonance current 20a of the charging unit 14a. The resonance voltage and/or the resonance current 20a is/are detected by the sensor 18a, in particular at a resonance component, within the charging unit 14a. The resonance voltage and/or the resonance current 20a is/are monitored continuously during a charging process by the detector unit 16a. The curve diagrams of FIGS. 2 and 3 are showing, that the resonance voltage and/or the resonance current 20a is/are comprising a constant amplitude 38a over a time interval 36a, during which the battery 12a is located on the charging unit 14a. After a point in time to 34a, at which the battery 12a is removed from the charging unit 14a, the amplitude 38a of the resonance voltage and/or the resonance current 20a increases constantly, in particular due to a reduced attenuation and/or a detuning of a resonance frequency.

If the detector unit 16a is provided for detecting a deviation of the resonance voltage and/or the resonance current 20a from a limit value 28a during a charging process and interrupting the transmission of electrical energy from the charging unit 14a to the battery 12a subsequently, than the transfer of electrical energy from the charging unit 14a to the battery 12 is interrupted immediately by the detector unit 16a at a point in time $t_1$ 40a, at which the amplitude 38a of the resonance voltage and/or the resonance currant 20a exceeds a predetermined limit value 28a (see FIG. 2).

Alternatively or additionally the resonance voltage and/or the resonance current 20a may be detected several times within predetermined succeeding time periods 26a as shown in FIG. 3. In particular the amplitude 38a of the resonance voltage and/or of the resonance current 20a is measured by the sensor 18a within each period 26a at a plurality or discrete, in particular equidistant, points in time 42a. The measured values of each period 26a are compared with each other by the detector unit 16a. If a steady increase 30a of the resonance voltage and/or the resonance current 20a is detected by the detector unit 16a by comparing the measured values, the transfer of electrical energy from the charging unit 14a to the battery 12a is interrupted immediately by the detector unit 16.

FIG. 4 shows another embodiment of the invention. The following descriptions and the drawings are essentially limited to the differences between the embodiments, whereas with respect to the same components, in particular with regard to components with the same reference signs, reference may be made to the drawings and/or the description of the other embodiments, in particular the FIGS. 1 to 3. To distinguish the exemplary embodiments the letter a is added to the reference signs of the embodiment shown in FIGS. 1 to 3, in the embodiment of FIG. 4 the letter a is replaced by the letter b.

FIG. 4 shows a charging system 32b with an inductive charging device 10b and a battery 12b. The inductive charging device 10b is provided for inductive charging the battery 12b. The battery 12b is formed as a portable power tool battery. The battery 12b is integrated in a handheld power tool 24b, which is only partially shown. The inductive charging device 10b includes a charging unit 14b. The charging unit 14b is provided for transferring electrical energy to the battery 12b during a charging process. For this purpose the battery 12b is put on the charging unit 14b of the inductive charging device 10b. Further, the charging device 10a includes a detector unit 16b. The detector unit 16b is provided for detecting a removal of the battery 12b from the charging unit 14b during a charging process. The detector unit 16b comprises a sensor 18b, in particular a current and/or voltage sensor. The sensor 18b is provided for monitoring, a resonance voltage and/or a resonance current 20b or the charging unit 14b during a charging process.

The invention claimed is:

1. An inductive charging device for charging at least one battery comprising:
    a charging unit configured to generate at least one of a resonance voltage and a resonance current to transfer electrical energy to the at least one battery via an inductive charging process in which the battery is not electrically conductively connected to the charging unit during the inductive charging process; and
    a detector unit electrically conductively connected to the charging unit in the inductive charging device and not electrically conductively connected to the at least one battery, the detector unit configured to detect a removal of the at least one battery from the charging unit during the inductive charging process, the detector unit including at least one sensor configured to monitor at least one of the resonance voltage and/or the resonance current of the charging unit, and the detector unit configured to detect the removal of the at least one battery from the charging unit in response to the at least one sensor measuring a steady increase of at least one of the resonance voltage and the resonance current over time that exceeds a predetermined limit value.

2. The inductive charging device according to claim 1, wherein the detector unit is further configured to interrupt the transmission of electrical energy in response to detection of the removal of the at least one battery.

3. An inductive charging system comprising:
    at least one battery; and
    at least one inductive charging device configured to charge the at least one battery via an inductive charging process in which the at least one battery is not electrically conductively connected to the at least one inductive charging device during the inductive charging process, the at least one inductive charging device comprising:
        a charging unit configured to generate at least one of a resonance voltage and a resonance current to transfer electrical energy to the at least one battery via an inductive charging process; and
        a detector unit electrically conductively connected to the charging unit and not electrically conductively connected to the at least one battery, the detector unit configured to detect a removal of the at least one battery from the charging unit during the inductive charging process, the detector unit including at least one sensor configured to monitor at least one of the resonance voltage and the resonance current of the charging unit, and the detector unit configured to detect the removal of the at least one battery in response to the at least one sensor measuring a steady increase of at least one of the resonance voltage and the resonance current over time that exceeds a predetermined limit value.

4. The inductive charging system according to claim 3, wherein the at least one battery is integrated into a portable power tool.

5. A method for detecting a removal of at least one battery during an inductive charging process carried out by an inductive charging device, comprising:
- generating, with a charging unit, at least one of a resonance voltage and a resonance current to transfer electrical energy to the at least one battery via an inductive charging process in which the battery is not electrically conductively connected to the charging unit during the inductive charging process; and
- detecting, with a detector unit electrically conductively connected to the charging unit in the inductive charging device and not electrically conductively connected to the at least one battery, removal of the at least one battery from the charging unit during the inductive charging process using at least one sensor configured to monitor at least one of the resonance voltage and the resonance current of the charging unit, and detecting with the detector unit the removal of the at least one battery in response to the at least one sensor measuring a steady increase of at least one of the resonance voltage and the resonance current over time that exceeds a predetermined limit value.

6. The method according to claim 5, further comprising: continuously monitoring the resonance voltage and/or the resonance current during the inductive charging process.

7. The method according to claim 5, further comprising: detecting the resonance voltage and/or the resonance current several times within a specified time period.

8. The method according to claim 5, further comprising: interrupting a transmission of electrical energy to the at least one battery in response to detection of the removal of the at least one battery.

* * * * *